Feb. 24, 1925.
T. L. CURLEY
VACUUM LUNCH KIT
Filed Jan. 25, 1924
1,527,349
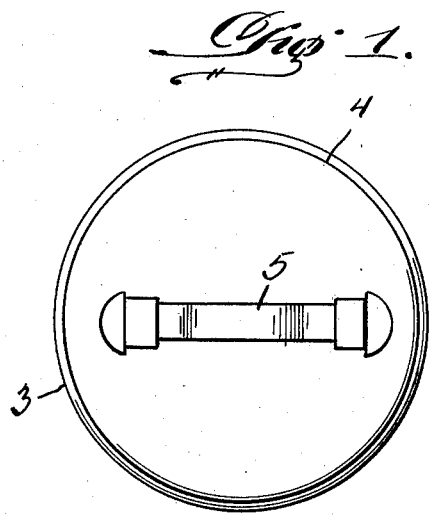
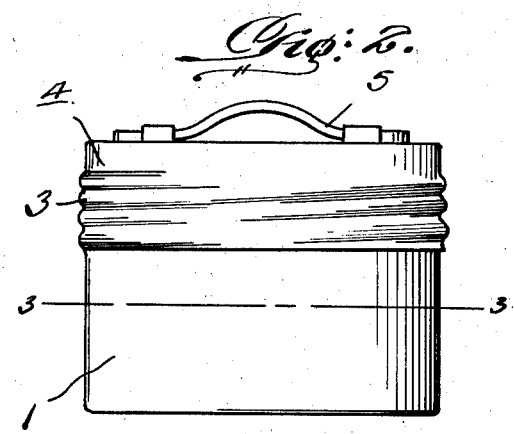
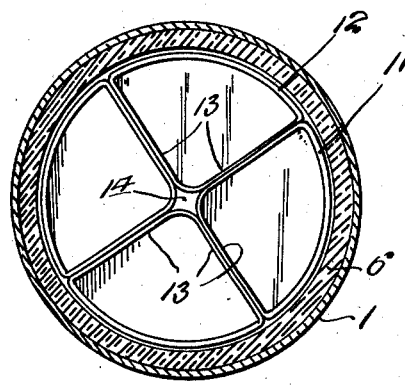
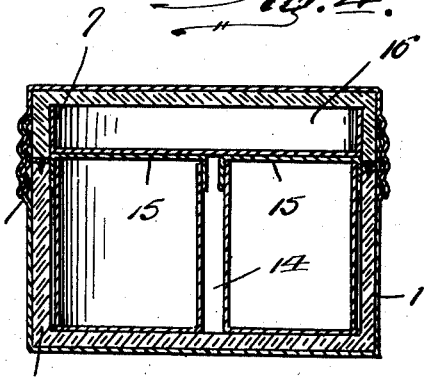
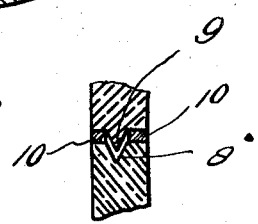
T. L. Curley,
INVENTOR.
BY
ATTORNEYS.

Patented Feb. 24, 1925.

1,527,349

UNITED STATES PATENT OFFICE.

THADDEUS L. CURLEY, OF SIOUX CITY, IOWA.

VACUUM LUNCH KIT.

Application filed January 25, 1924. Serial No. 688,478.

*To all whom it may concern:*

Be it known that I, THADDEUS L. CURLEY, a citizen of the United States, residing at Sioux City, in the county of Woodbury and State of Iowa, have invented certain new and useful Improvements in Vacuum Lunch Kits, of which the following is a specification.

This invention relates to improvements in vacuum lunch kits adapted for containing a hot meal and preserving the same in a heated condition for a substantial period of time.

An object of the invention resides in providing an outer receptacle formed of cooperating sections adapted for containing a vacuum receptacle formed of cooperating sections, said outer receptacle being formed for threaded cooperation, so that a relative rotation of one of the sections on the other will hold the sections of the vacuum receptacle in tight cooperation for insulating the interior thereof from the atmosphere.

Another object of the invention resides in providing a vacuum receptacle formed of separable sections held in assembled relation by an outer container in which are arranged a plurality of food containers of sectional form so arranged in said receptacle that they may be independently or simultaneously removed therefrom in a single operation.

A still further object of the invention resides in providing a sectional vacuum container held in assembled relation by an outer container, said containers being of cylindrical form and the vacuum container being adapted to receive a plurality of interfitting food receptacles formed in quadrangle sections that they may be removed independently of one another from said container or may be removed simultaneously in assembled relation.

The invention also includes other objects and advantages in the details of construction and assemblage of the parts which are more particularly pointed out in the following description and claim directed to a preferred form of the invention, it being understood, however, that slight variations may be made in this structure without departing from the spirit and scope of the invention.

In the drawings, forming a part of this application:—

Figure 1 is a plan view of the invention in assembled relation.

Figure 2 is a side elevation thereof.

Figure 3 is a sectional view taken on the line 3—3 of Figure 2.

Figure 4 is a longitudinal vertical sectional view through the invention in assembled relation, and Figure 5 is a detail section of the joint between the vacuum container sections.

1 indicates the bottom portion of the outer receptacle, which is preferably formed of metal or other similar and suitable material to provide a protecting casing for the contained parts, the upper free edge of the bottom being provided with a threaded portion 2, adapted to receive the threaded portion 3 of the cooperating cap section 4, which is provided on the top thereof with a handle generally indicated at 5 of any suitable form, so that the container may be easily carried in the hand.

A vacuum container is housed within the receptacle 1 and comprises a pair of cooperating sections including a bottom section 6 and a top or cover section 7, the upper end of the container 6 being provided with a V-shaped groove 8 adapted to receive a corresponding V-shaped projection 9 on the lower edge of the cover 7 when the parts are placed in interfitting relation, so that a pair of rubber or other sealing members 10 are arranged in concentric relation on the inner and outer sides of the projection 9 which will be compressed to seal the joints of the cover section with the container to insulate the interior of the container from the atmosphere. While the section of the vacuum container 6 and the cover 7 therefor is shown in the drawing as a solid section, this is merely diagrammatical because the construction of the container and the cover as provided with the heat insulating qualities of the well known vacuum bottle does not form part of this invention, but is made according to vacuum bottle construction now used in the art, the only details of construction being above described in connection with the assembly of the cover section with the bottom section 6 in order to insulate the joint against the passage of heat therethrough.

It will be noted that the outer receptacle and the vacuum container are of cylindrical form, and are adapted to receive a plurality of food containers and holders 11 adapted for interfitting relation within the container 6 and having arcuate outer walls 12 and radially extending inner walls 13, so that the inner ends of the receptacles are arranged in adjacent relation at the central portion of the container as indicated at 14, in order that all of the receptacles may be simultaneously removed from the container 6 by grasping the inner ends thereof with the fingers and sliding them upwardly and out of the vacuum container. It will also be apparent that any one of the receptacles may be removed from the vacuum container independently of the others as the central portion of the vacuum container as indicated at 14 is open between the containers to permit the insertion of the fingers therein to grasp the opposite sides of the inner end of any one container. Covers are provided for each of the containers as indicated at 15 which tightly fit the same and prevent the spilling of liquid material which they are adapted to contain if desired, the upper ends of the containers terminating adjacent the upper end of the vacuum container 6 and the upper portion of the vacuum container being adapted in assembled relation to receive a pan of annular form as indicated at 16.

The food containers 11 are each adapted to contain a portion of a meal which may be either liquid or solid after which the covers are applied to each container, and the pan 16 fitted over the upper surface of the top in which may be placed pie, cake, or other dessert, or the knife, fork, spoon, or napkin, to be used when eating the meal. The pan 16 is also adapted for disconnection to serve as a plate upon which the food from the containers 11 may be served.

The outer receptacle 1 and the cap section 4 not only serve to protect the vacuum container against injury and breakage, but also are adapted in threaded cooperation to force the cover section onto the bottom section 6 of the vacuum container in order that the sealing washer 10 be compressed at the joint between the container sections to hold these sections in sealed relation until it is desired to use the contents so that the outer receptacle and cap portion cooperate to perform a dual function in connection with the vacuum receptacle section.

What is claimed is:

A thermo-container comprising an inner receptacle consisting of a pair of sections adapted to engage each other at their edges and having interfitting groove and rib connections, a packing interposed between the edges of the sections at the rib and groove thereof, an outer receptacle composed of sections having screw thread engagement with each other and adapted to snugly receive the inner receptacle, a plurality of containers adapted to be received within the inner receptacle and having detachable lids and a single container adapted to rest upon the lid of the plurality of containers and extending over all of the containers and having contact with the upper section of the inner receptacle whereby the containers are drawn in close contact with each other when the sections of the outer receptacle are drawn toward each other.

In testimony whereof I affix my signature.

THADDEUS L. CURLEY.